Dec. 29, 1942.  J. A. TOLMAN  2,306,984
FILTER DEVICE
Filed June 24, 1940  2 Sheets-Sheet 1
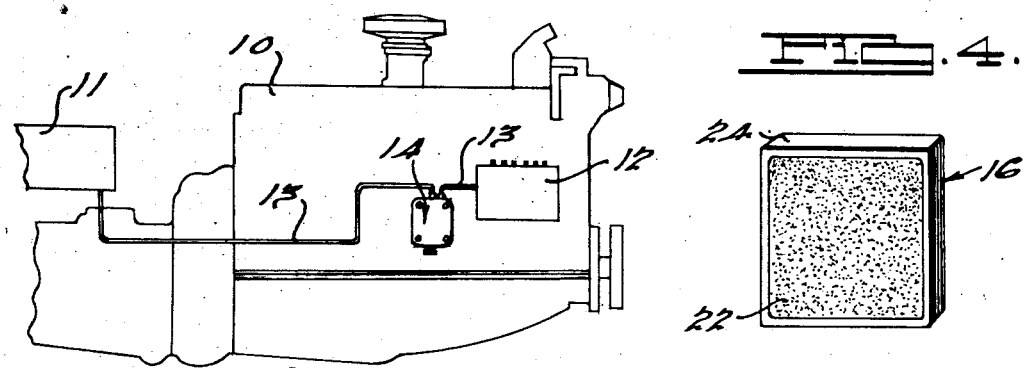
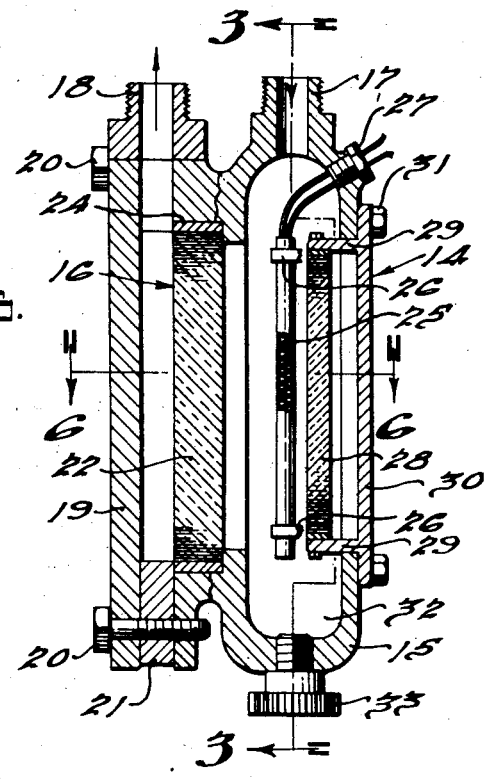
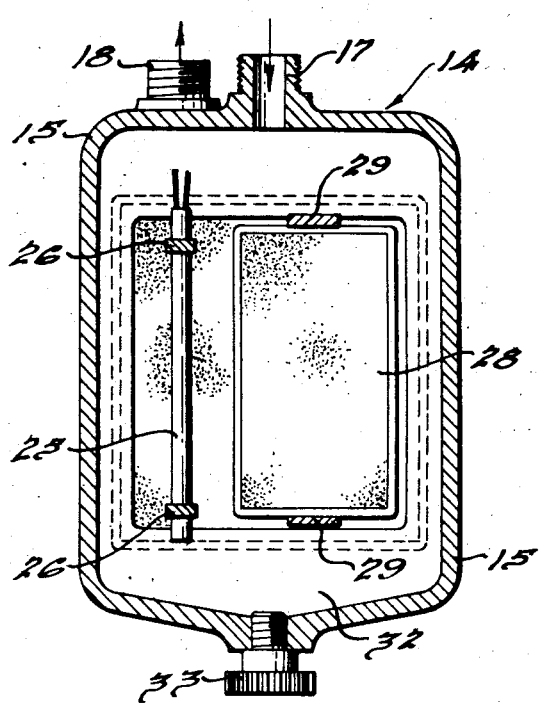
INVENTOR
John A. Tolman.
BY Dike, Calver & Gray
ATTORNEYS.

Dec. 29, 1942.  J. A. TOLMAN  2,306,984
FILTER DEVICE
Filed June 24, 1940   2 Sheets-Sheet 2
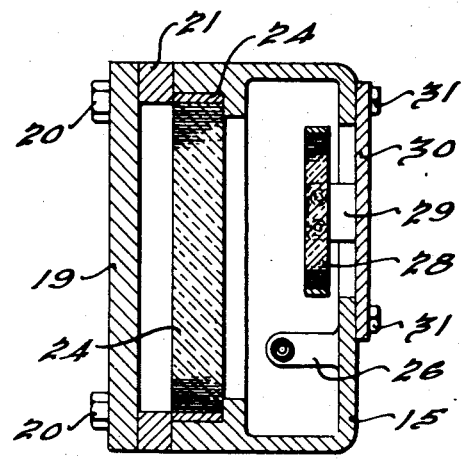
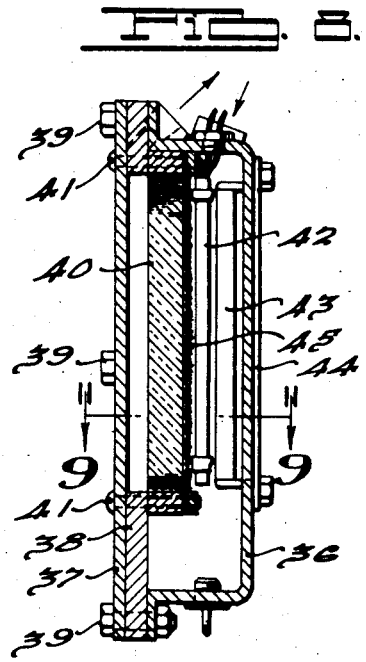
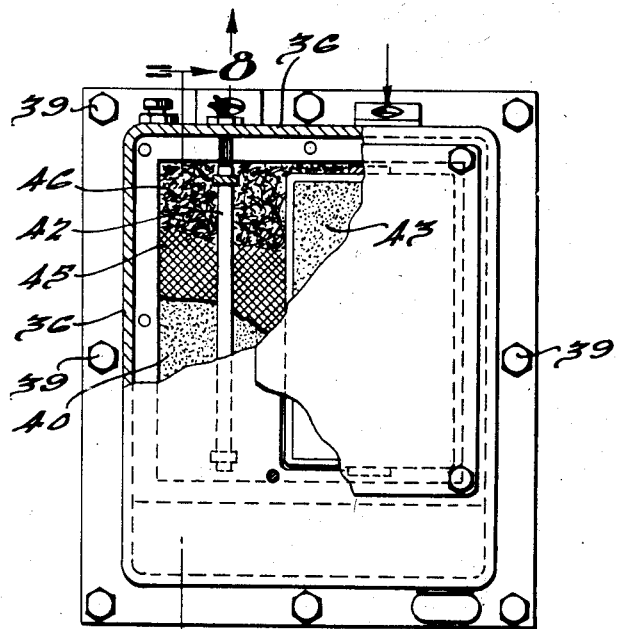
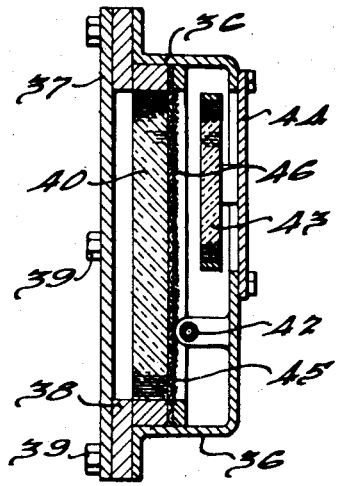
INVENTOR
John A. Tolman.
BY Dike, Calver & Gray
ATTORNEYS.

Patented Dec. 29, 1942

2,306,984

UNITED STATES PATENT OFFICE 2,306,984

FILTER DEVICE

John A. Tolman, Detroit, Mich.

Application June 24, 1940, Serial No. 342,047

1 Claim. (Cl. 210—165)

This invention relates to internal combustion engines, particularly to such engines of the Diesel type, and to filter devices used for filtering fuel oil therefor.

One of the objects of the present invention is to provide an improved filter device for Diesel engines, which enables removing from fuel oil solids heretofore considered not susceptible of separation by filtration, such for instance as paraffin in colloidal form, which may be present in oils used in Diesel engines, particularly in the oils of lower grades.

Another object of the present invention is to provide an improved Diesel engine having a filter device for fuel oil, which device is capable of separating maximum amount of undesirable solids which may be present in the fuel oil, thus preventing objectionable precipitation and deposits thereof in the fuel feed system of the engine.

A further object of the invention is to provide an improved Diesel engine having a filter device made of such a material that undesirable catalytic action thereof on the fuel oil and the detrimental effects thereof are largely eliminated.

A still further object of the invention is to provide a filter device for an internal combustion engine having hygroscopic means for separating the water which may be contained in the fuel oil.

A still further object of the invention is to provide a filter device for an internal combustion engine, having means whereby clogging of the filter in cold weather because of partial solidification of oil is prevented.

It is an added object of the present invention to provide an improved filter device of the above character, which is simple in construction, dependable in operation, easy to clean and repair, and is relatively inexpensive to manufacture.

Other objects and advantages of this invention will appear in the following description and appended claim, reference being had to the accompanying drawings forming a part of this specification wherein like reference characters designate corresponding parts in the several views.

Fig. 1 is a diagrammatic view showing an internal combustion engine of the Diesel type provided with a fuel tank and a fuel distributing apparatus and having a filter device embodying the present invention operatively imposed therebetween.

Fig. 2 is a sectional view illustrating the filter device embodying the present invention.

Fig. 3 is another sectional view illustrating the device in Fig. 2, said view being taken in the direction of the arrows on the section plane passing through line 3—3 of Fig. 2.

Fig. 4 illustrates in perspective the filtering member used in the filter device, said member being shown separately.

Fig. 5 is a view illustrating the arrangement of the strands forming the filtering medium of the filtering member shown in Fig. 4.

Fig. 6 is a transverse sectional view taken in the direction of the arrows on the section plane passing through the line 6—6 of Fig. 2.

Fig. 7 is a side view with parts broken away of a modified construction of the filter device embodying the present invention.

Fig. 8 is a sectional view taken in the direction of the arrows on the section plane passing through the line 8—8 of Fig. 7.

Fig. 9 is another sectional view illustrating the device shown in Figs. 7 and 8, said view being taken in the direction of the arrows on the section plane passing through the line 9—9 of Fig. 8.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, an internal combustion engine of the Diesel type having a source of fuel supply and a fuel distribution apparatus, the filter device embodying the present invention being operatively interposed therebetween. Two embodiments of the present invention are illustrated in the drawings, said embodiments representing filters for the fuel oil of the Diesel engine. Although the filter devices illustrated and described herein are particularly adapted for filtering the fuel oil used in engines of the Diesel type, it will be understood that they may be successfully applied for filtering liquid fuels used in internal combustion engines of different types as well as for filtering oils not necessarily intended as fuel.

Referring to Fig. 1, the same illustrates a Diesel engine 10 of any suitable design provided with a fuel oil tank 11 and a fuel distributing apparatus 12 of any suitable type. The fuel tank 11 and the fuel distributing apparatus 12 are operatively connected with the aid of a conduit 13 in which there is operatively interposed a filter device embodying the present invention, said device being generally indicated by the numeral 14.

Referring to Figs. 2, 3 and 6, said device comprises a casing 15 provided with a recess adapted to receive a filtering member generally indicated by the numeral 16. Said casing is provided with an inlet connection 17 and an outlet connection 18 opening into the casing 15 with suitable ports or openings. As can be clearly seen from an examination of Fig. 2, the filter member 16 is operatively arranged between said inlet 17 and said outlet 18 in the path of the oil which must, therefore, pass through the filtering member 16. A removable cover 19 is secured to the casing 15 with the aid of screws 20, a spacer member 21 being interposed between the cover 19 and the casing 15.

The filtering member 16 comprises a plurality of substantially cylindrical strands 22 arranged in longitudinal contact, as is clearly illustrated in Fig. 5, to form capillary channels 23. The strands 22 may be encircled with a retainer member 24 adapted to maintain said strands under transverse compression and thus forming with said strands a unitary structure. The strands, however, may be retained together in operative relation by other means, such as by fusing the strands together along their lines of contact.

It is preferable to use strands made of suitable extrusile material and of such a character, that the strands are chemically inert with relation to the oil to be filtered. It is preferable to use strands made of extruded glass less than .001 of an inch in diameter. Depending upon the intended function of the filter device and of the grade of oil used, the strands may be as fine as .0001 of an inch in diameter. Although glass strands give very good results, it may be desirable in some instances to use other materials of inert or substantially inert character such for instance as fine stainless steel strands or mineral coated glass strands, or strands formed from minerals other than used in the manufacture of glass.

The retainer member 24 is made preferably of metal and may be heat shrunk on the strands to ensure desired degree of compression under which is holds the strands. The filter member 16 may be ground from both of its sides in order to provide smooth surfaces very easy to clean. By virtue of the above described construction the filtering member provides a strong unitary structure and resembles in its appearance a piece of strong board or plate of homogeneous material and is, therefore, very convenient to handle when the filtering device is manufactured, cleaned or repaired.

Because of the extremely fine capillary channels formed in the filter medium and the decreased viscosity of oil in cold weather, flow of oil through filtering mediums or members is greatly reduced in cold weather and may be effected with difficulty. For the purpose of eliminating this difficulty, there is provided in my improved device adjacent the filtering member 16 and within the casing 15 on the inlet side thereof an electric heater 25 supported by brackets 26, said heater being electrically connected with a suitable source of electric current by means of conductors passing through a plug 27. By the provision of the electric heater solidification of oil during extreme cold weather is prevented and starting of the engine is made easier.

In accordance with the invention means are provided whereby the water which may be contained in the oil is separated therefrom. In the present embodiment of the invention said means are in the form of a hygroscopic element 28. I prefer to use a hygroscopic element of a construction similar to that of my filtering member 16, since due to the capillary character of the filtration channels 23 they produce a capillary phenomenon or drawing of the water into the capillaries and retaining it therein.

The element 28 is held between the brackets 29 provided on a cover 30 secured to the casing 15 with the aid of screws 31. The element 31 may be removed from time to time for washing and drying, at which time the cake formed on the intake face of the filtering member 16 is also removed. Heavier impurities such as sand particles and the like, as well as part of the water, fall into the bowl 32 formed in the lower portion of the casing 15 on the intake side of the filtering member 16, and are removed therefrom through a drainage plug 33.

Figs. 7, 8 and 9 illustrate a filter device of a substantially similar construction but produced mainly by stamping operation from sheet material such as metal and, therefore, adapted for manufacture in large quantities and at a low price. As can be clearly seen from an examination of Figs. 7, 8 and 9, the filter device illustrated therein comprises a casing 36, a cover 37 spaced from the casing 36 with the aid of a spacer 38 and secured to the casing with the aid of screws 39. A filtering member 40 is secured to the spacer with the air of screws 41. The numerals 42 and 43 indicate the electric heater and the hygroscopic element, respectively, above described. The element 43 is secured to the cover 44 and can be easily removed for inspection and cleaning.

In some instances it may be desirable to use a filtering aid, which is to say, a loose granulated material adapted to be deposited on the intake face of the filtering member and enabling quicker formation of a cake. Sometimes it is also preferable to place a coarse screen at the intake face of the filtering member over which the filtering aid is deposited in any suitable way, such as by coating it with a filter aid material. With such a construction removal of the screen only is necessary for cleaning the filtering member. In the structure of Figs. 7, 8 and 9 the filter aid supporting screen is indicated by the numeral 45 and the layer of filter aid by the numeral 46.

I claim:

In a Diesel engine having a source of fuel oil supply and an oil distributing apparatus, a filter device operatively interposed between said source and said apparatus and including a stamped casing having an inlet and an outlet, a filtering member removably arranged between said inlet and said outlet, said member comprising a plurality of extruded glass strands arranged in longitudinal contact with each other, and a metal retainer shell encircling said strands and maintaining the same under transverse pressure, the flow of oil through said member being parallel to the strands, a screen operatively disposed adjacent said filtering member on the inlet side thereof and adapted to support a predetermined amount of filter aid.

JOHN A. TOLMAN.